United States Patent

[11] 3,598,497

| [72] | Inventor | Bengt Ebbe Harald Nyman<br>Rockford, Ill. |
|---|---|---|
| [21] | Appl. No. | 854,507 |
| [22] | Filed | Sept. 2, 1969 |
| [45] | Patented | Aug. 10, 1971 |
| [73] | Assignee | Atlas Copco Aktiebolag<br>Nacka, Sweden |
| [32] | Priority | Sept. 10, 1968 |
| [33] | | Sweden |
| [31] | | 12127/68 |

[54] POWER-OPERATED UNIT FOR DRILLING AND SIMILAR PURPOSES
7 Claims, 4 Drawing Figs.

[52] U.S. Cl.................................................. 408/130, 10/139 R, 408/11

[51] Int. Cl................................................... B23b 47/24
[50] Field of Search.................................... 77/32.7; 10/139

[56] References Cited
UNITED STATES PATENTS
3,336,821  8/1967  Firth............................ 77/32.7

Primary Examiner—Francis S. Husar
Attorney—Bauer and Goodman

ABSTRACT: A drilling unit is arranged which has power means for moving the drill axially. When, during rapid feed motion, the drill engages a workpiece, a cutoff valve blocks off a passage for a speed-controlling hydraulic fluid flow. The fluid must now pass a metering valve. This results in a slower working feed.

PATENTED AUG 10 1971
3,598,497
SHEET 1 OF 2
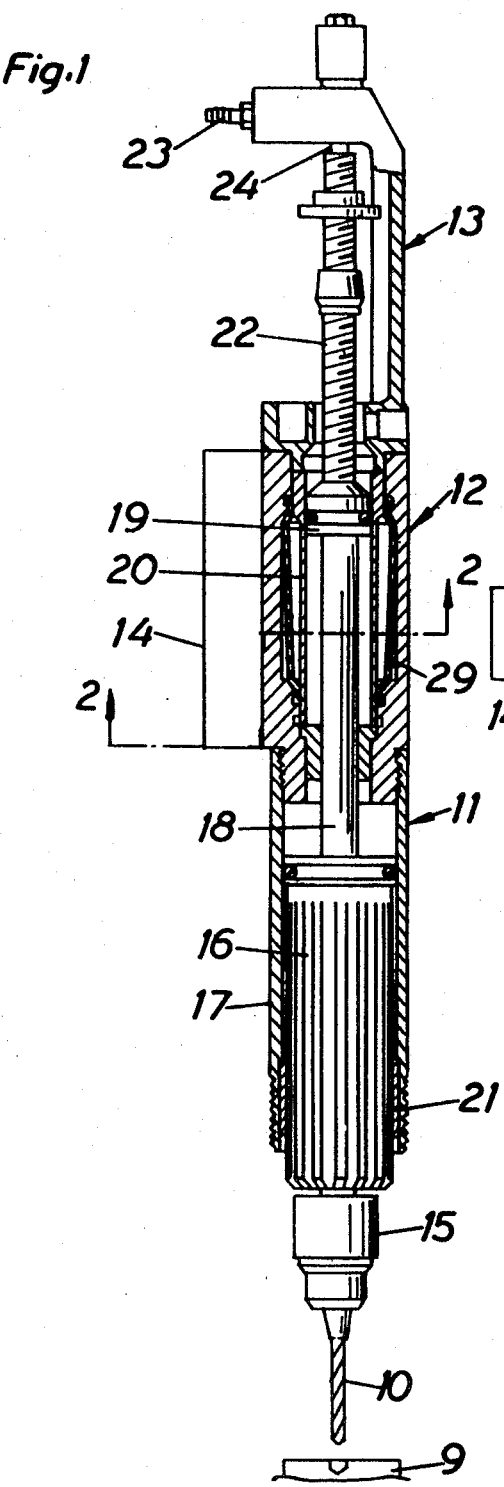
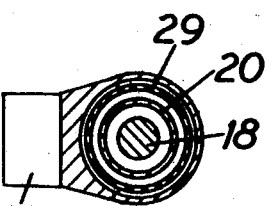
INVENTOR.
BENGT E.H. NYMAN
BY Bauer & Goodman
Attorneys

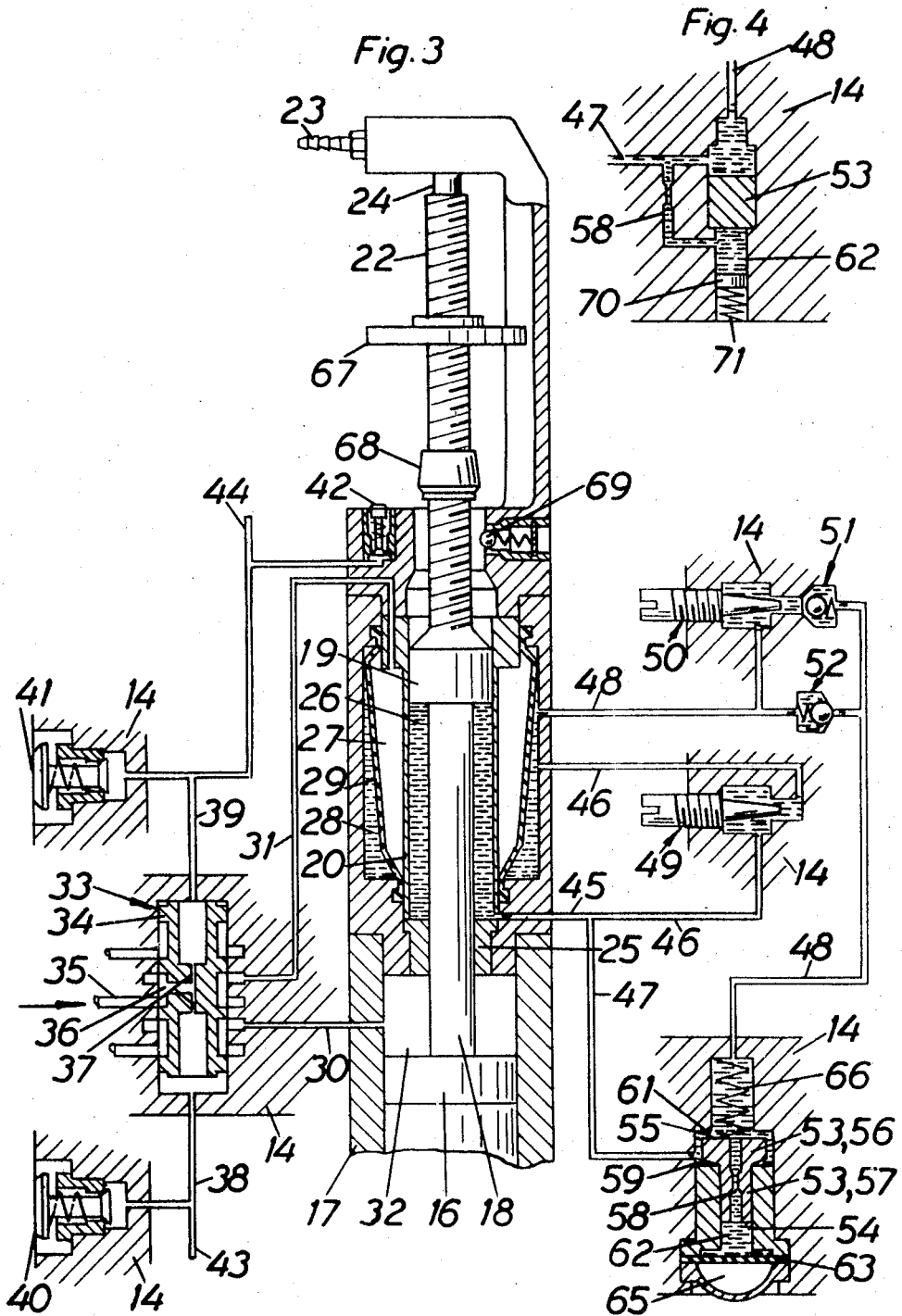

POWER-OPERATED UNIT FOR DRILLING AND SIMILAR PURPOSES

This invention relates to a power operated unit for drilling, tapping, reaming, etc., which is arranged for mechanized feeding and retracting of a tool element, and which has a hydraulic control means for automatically transforming a feed motion or advance of the tool element from a high-speed approach feed into a controlled low speed working feed when the tool element contacts the workpiece. To effect this, the hydraulic control means comprises two passages or branches, connected in parallel, through which hydraulic fluid flows during feed motion. An automatically operating cutoff valve is disposed in one of the branches to shut off this branch so as to effect this change of speed.

In connection with a prior embodiment of such a power-operated unit, there is used such a cutoff valve, which via a conduit is directly biased by compressed air, creating a force which tends to close the valve. The engagement of the tool element with the workpiece, creates a rise in the air pressure and the valve automatically closes. This action is comparatively slow and, in unfavorable situations, the work tool must take up considerable force before the valve closes.

It is therefore an object of the invention to eliminate these disadvantages and to create a unit of the aforementioned type which is provided with a valve which automatically takes up its open position, but, at a small yet quick reduction in the pressure of the flowing hydraulic fluid, takes up its closed position independently of the initial pressure of the liquid.

For these and other purposes I provide a power-operated unit for drilling and similar purposes comprising a first part adapted to be mounted in a frame or the like, a second part movably carried by said first part and rotatably carrying a tool element such as a drill, a motor for rotating said tool element, means for feeding and retracting said second part with respect to a workpiece, and hydraulic control means for controlling the rate of movement and dividing a feed motion into a high-speed approach feed and a low speed working feed which control means comprises a conduit system having a first and a second branch connected in parallel, and means for providing a hydraulic fluid flow proportional to the feed speed through said conduit system, said first branch being restricted so as to limit the flow therethrough and said second branch incorporating a valving element which is capable of cutting off the flow therethrough when a sudden reduction in the pressure in the hydraulic fluid flow occurs due to engagement of the tool element with the workpiece and, when in open condition during approach feed, is biased towards the open position by the pressure of the hydraulic fluid downstream of said valving element working on a first surface thereof and biased towards closed position by means of hydraulic fluid in a fluid chamber working on a second surface thereof, the fluid in said fluid chamber being connected to the fluid in said second branch by means of a leak passage and being resiliently loaded by a piston element.

The above and other objects of the invention are obvious from the following description and the accompanying drawings in which a preferred embodiment of the invention is illustrated by way of example. It is to be understood that various modifications may be made within the scope of the claims.

In the drawings:

FIG. 1 is a longitudinal section of a power operated unit according to the invention;

FIG. 2 is a section on line 2–2 in FIG. 1;

FIG. 3 is a longitudinal section, on a larger scale, through the rear and intermediate portions of the unit of FIG. 1, and is also a conduit diagram of the feeding and retraction means with its pneumatic and hydraulic components, which are parts of a valve block illustrated in FIG. 1;

FIG. 4 is a section through a modified form of a cutoff valve illustrated in FIG. 3.

In the unit illustrated, a stationary part 11 carries an axially movable part 15, 16, 18, 19, 22, which carries and rotates a tool element 10 illustrated as a drill. The stationary part 11 comprises: a forward portion in the form of a cylinder 17 which is to be fixed to a nonillustrated frame which may support a number of units; an intermediate portion 12 with a cylinder 20 and a detachable valve block 14; and a back head 13. The movable part comprises: a toolholder or chuck 15; a power unit 16, the rear portion of which constituting a feed piston which is slidable in the cylinder 17; and a piston rod 18 of the feed piston carrying a return piston 19 which is slidable in the cylinder 20. The piston rod 18 is slidingly sealed against a bushing 25, which defines end parts of the cylinders 17 and 20. At the rear of the piston 19 the piston rod 18 becomes a cam rod 22 on which a cam 68 and a plate 67 are adjustably mounted. Rotation between the movable part 15, 16, 18, 19, 22 and the stationary part 11 is prevented by external straight splines on the power unit 16 mating with internal splines in a sleeve 21 attached to the cylinder 17.

The power unit 16 comprises a rotary motor which via a gearing rotates the chuck 15. The rotary motor may be a pneumatically operated sliding vane motor, which is supplied with compressed air via a longitudinal channel extending through the cam rod 22 and the piston rod 18. The air is supplied to the cam rod 22 by means of a hose fitting 23, a nonillustrated passage in the back head 13, and a pipe 24 which is fixed to the back head and inserted in and slidingly sealed by suitable sealing means to the channel in the cam rod. A not shown motor valve at the rear end of the back head 13 is controlled by the cam rod 22 and admits compressed air to the motor as soon as the cam rod 22 leaves its retracted position and shuts off the airflow when this retracted position is again reached. Thus, the motor rotates during an entire cycle of feed motion and return motion.

A cylinder chamber 26 of the cylinder 20, FIG. 3, in front of the piston 19 is filled with a hydraulic fluid e.g. hydraulic oil. Via a system of channels in the valve block 14 which includes channels 45–48 and various valves 49–53, the cylinder chamber 26 is connected with an annular hydraulic fluid reservoir 28 which is separated from an annular air chamber 27 by means of a sealingly mounted elastic membrane 29. Via channels 30, 31, the air chamber 27, and an air chamber 32 of the cylinder 17 at the rear of the feed piston/power unit 16 may be supplied with compressed air respectively vented through an air-distributing and direction-controlling valve 33 which is in the valve block 14 and has a valving slide shown as a spool 34.

Through a main supply conduit 35, live air is supplied to the air-distributing valve 33 and through leak passages in the form of a bore 36 and restricted channels 37 in the valving slide, air is continuously leaking into two end chambers/control chambers of the air-distributing valve 33. Control conduits 38, 39 are connected to these chambers. the air-distributing valve is controlled by instantaneous venting of either of the control conduits 38, 39. For this purpose, there are venting valves 40, 41, 42 of the poppet valve type connected to the control conduits 38, 39. The valve 40 is a start valve for manually initiated start. The valve 41 is a stop valve for manually initiated stop. The valve 42 is a limit valve which initiates retraction. Remote-controlled starting and stopping may be obtained by external venting through one of two conduits 43, 44, which are plugged when remote control is not utilized. Relatively great friction between the valving slide 34 and the cylinder in which it is reciprocating is obtained by the use of sealing O-rings (not illustrated). Therefore, the slide 34 is retained in the position it takes up when either of the control channels 38, 39 is instantaneously vented.

With the valving slide 34 in its position for effecting feed motion (not illustrated), which position is obtained by venting of the conduit 38, compressed air flows from the main supply conduit 35, which is connected with a suitable source of compressed air, through the air distributing valve 33 and the channel 30 to the cylinder chamber 32 and sets the power unit 16 in feed motion. By this motion, the piston 19 forces the hydraulic fluid in the cylinder chamber 26 to flow through the channel 45 and one or both of two passages or branches 46; 47—48 of the hydraulic fluid conduit system in the valve block 14 and finally into the hydraulic fluid reservoir 28 as will be described in detail. Simultaneously, the air chamber 27 is vented through the channel 31; therefore, there is no resistance to movement of the membrane 29, and the reservoir 28 is capable of accumulating the flowing hydraulic fluid.

If the conduit 39 is now vented, the slide 34 of the air-distributing valve 33 is forced to its position for effecting retraction (illustrated in FIG. 3), then the air chamber 27 is pressurized through the conduit 31 and the conduit 30 is vented. The hydraulic fluid in the reservoir 28 is now forced mainly through the branch, consisting of the channels 48, 47, 45, into the cylinder chamber 26. This passage incorporates an adjustable restriction valve 50, a check valve 51, and a cutoff valve in the form of a valving element 53. These are now in positions to permit this flow as illustrated in FIG. 3. The passage also incorporates a channel controlled by a check valve 52. This channel bypasses the restriction valve 50 and the check valve 51. The check valve 52, however, is closed to fluid flowing in this direction. A small part of the flowing hydraulic fluid flows through the passage or branch 46 which incorporates an adjustable restriction valve 49. When, as described, the return piston 19 thus is forced to retract by the action of the hydraulic fluid flow, the piston withdraws the power unit 16. The speed of retraction is adjusted by means of the restriction valve 50.

The cutoff valve 53 has a head 56 with an end face 55, which cooperates with a valve seat 61. It also has a stem 57 which is slidable in a cylindrical hydraulic chamber 62. A restricted channel 58 forming a leak passage in the valve 53 connects the chamber 62 with the liquid in the channel 48. An elastic membrane 63 serves as a piston element and as a partition element between the hydraulic fluid in the chamber 62 and the air in a closed air chamber 65.

The valve 53 is loaded by hydraulic fluid acting on surfaces 54, 55, 59 as well as by a spring 66. The pressure of the hydraulic fluid in the cylinder 62 accommodates to the pressure of the flowing fluid in channel 48 because liquid can bleed through the leak passage 58. Thus, the valve 53 is maintained in open position by the force of the spring 66 only, independently of the pressure of the hydraulic fluid. Slow fluctuations in the pressure is balanced by a flow through the leak passage 58.

In FIG. 4 there is shown a modified form of the cutoff valve 53 which consists of a cylindrical slide without seating action. In this case, a piston 70 biased by a spring 71 is used in place of the membrane 63 biased by the air in the air chamber 65. Details corresponding to details in FIG. 3 have been given the same reference numerals as in FIG. 3.

The action of the cutoff valve will now be described with reference to FIG. 3. Assuming, that a return movement is completed and that the movable portion 16, 18, 19, 22 of the unit is in its retracted position, the air chamber 27 is maintained under pressure. The cutoff valve 53 is in its open position due to the action of the weak spring 66. Feed motion begins when the control conduit 38 of the air-distributing valve 33 is vented either through the start valve 40 or through the conduit 43. Since the cutoff valve 53 is maintained in its open position as shown in the figure and, therefore, permits a comparatively unrestricted flow as well as the check valve 52 does, the approach of the drill 10 toward a workpiece 9 is rapid. The spring 66 overcomes the dynamic forces which tend to close the valve 53. Then, when the drill 10 reaches the workpiece 9, there is a sudden reduction in the pressure of the hydraulic fluid being forced through the branch 47—48 because the drill begins to take up some axial load. This results in a sudden reduction of the resultant liquid force which is exerted upon the head 56 of the valve 53 and tends to maintain the valve open. This resultant force is the force exerted on the surface 55 minus the force exerted on the surface 59. The air in the closed air chamber 65 acts as a spring and expands now so that the membrane 63 forces the liquid in the chamber 62 to act upon surface 54 and move the valve 53 to closed position. Since this closing action is very rapid there will be a negligible flow through the leak passage 58 during the short closing period. Since the annular air chamber 27 is vented during feed motion, approximately, atmospheric pressure exists in the hydraulic fluid channel 48 when the cutoff valve 53 is in closed position. Due to leakage through the leak passage 58, the pressure in the chamber 62 is slowly reduced. However, the valve 53 is maintained in closed position by the liquid pressure against the annular piston surface 59 of the head 56, which pressure creates a force stronger than the force of the spring 66.

Working feed is now effected at a speed which may be adjusted by means of an adjusting valve 49 since the speed is now determined by the hydraulic fluid flow through the branch 46. Then, when the plate 67 engages the limit valve 42, the conduit 39 is vented, the slide 34 of the air distributing valve changes position, and retraction is effected.

Due to its rapid action, this type of cutoff valve for automatically effecting the transformation of a high-speed approach feed into a slow-speed working feed upon engagement of the working tool with the workpiece is useful for most purposes. For very delicate operations, such as drilling slanting holes with thin drills, some thread cutting etc., changing of speed before this engagement may be preferable. This can be accomplished by a simulated engagement. The cam 68 is then forced to pass a detachably mounted spring biased ball 69 in the intermediate portion 12. This will retard the movable part 15, 16, 18, 19, 22 instantaneously so that the cutoff valve will take up closed position.

The invention is not limited to the embodiment illustrated but may be varied within the scope of the following claims.

I claim:

1. A power-operated unit for drilling and similar purposes comprising a first part adapted to be mounted in a frame or the like, a second part movably carried by said first part and rotatably carrying a tool element such as a drill, a motor for rotating said tool element, means for feeding and retracting said second part with respect to a workpiece, and hydraulic control means for controlling the rate of movement and dividing a feed motion into a high-speed approach feed and a low speed working feed which control means comprises a conduit system having a first and a second branch connected in parallel, and means for providing a hydraulic fluid flow proportional to the feed speed through said conduit system, said first branch being restricted so as to limit the flow there through and said second branch incorporating a valving element which is capable of cutting off the flow therethrough when a sudden reduction in the pressure in the hydraulic fluid flow occurs due to engagement of the tool element with the workpiece and, when in open condition during approach feed, is loaded towards the open position by the pressure of the hydraulic fluid downstream of said valving element working on a first surface thereof and loaded towards closed position by means of hydraulic fluid in a fluid chamber working on a second surface thereof, the fluid in said fluid chamber being connected to the fluid in said second branch by means of a leak passage and being resiliently loaded by a piston element.

2. A unit according to claim 1 in which said piston element comprises an elastic membrane which is loaded by gas in a closed chamber.

3. A unit according to claim 1 in which a spring is arranged to bias said valving element towards open position.

4. A unit according to claim 2 in which a spring is arranged to bias said valving element towards open position.

5. A unit according to claim 1 in which said second part comprises a power unit for carrying and rotating a toolholder for the tool element, a feed piston rigidly connected to said power unit for advancing the same, and a return piston coaxial with said first piston and rigidly connected therewith, and in which working unit said first part comprises a first cylinder in which said feed piston is reciprocable, a second cylinder in which said return piston is reciprocable, an annular space surrounding said second cylinder, and elastic membrane sealingly dividing said annular space into an air chamber and an hydraulic fluid reservoir, and air-distributing valve connected to a source of compressed air, to said first cylinder at the rear of said feed piston and to said air chamber, said hydraulic conduit system being connected between the second cylinder in front of the return piston and the hydraulic fluid reservoir and said air-distributing valve having a position for pressurizing the first cylinder and simultaneously venting the air chamber and a position for venting the first cylinder and simultaneously pressurizing the air chamber.

6. A unit according to claim 5 in which an adjustable restriction valve is disposed in said first branch.

7. A unit according to claim 6 in which a check valve is disposed in said second branch between said valving element and said hydraulic fluid reservoir to permit flow only in the direction from the second cylinder to the fluid reservoir, said check valve being bypassed by a passage controlled by an adjustable restriction valve and a check valve, the latter permitting flow only in the direction from the fluid reservoir to the second cylinder.